Patented Sept. 19, 1950

2,522,981

UNITED STATES PATENT OFFICE 2,522,981

COPOLYMERS OF BUTADIENE AND NUCLEAR - SUBSTITUTED POLY - HALO-ALPHA-METHYLSTYRENE

Gustave B. Bachman, La Fayette, Ind., and Guido H. Stempel, Jr., Pittsburgh, Pa.; said Bachman assignor to Purdue Research Foundation, La Fayette, Ind., a corporation of Indiana, and said Stempel, Jr., assignor to The General Tire & Rubber Company, Akron, Ohio, a corporation of Ohio No Drawing. Application May 9, 1946, Serial No. 668,474

12 Claims. (Cl. 260—82.1)

This invention relates to new rubbery copolymers of alpha-alkylarylethylene compounds that have a plurality of nuclear halogen atoms and to a method of preparing the same.

It is known that dichlorostyrenes, such as the 1-vinyl-2,4-dichlorobenzene, the 1-vinyl-2,5-dichlorobenzene and others, when properly polymerized or copolymerized produce rubbers having exceptional and desirable properties. Thus, the rubbery copolymer of one or more butadiene compounds and a mixture of the isomers of dichlorostyrene have properties in several respects superior to those of natural rubber for tire treads and the like. The dichlorostyrenes are somewhat disadvantageous, however, in that they tend to homopolymerize with exceedingly great rapidity. This fact necessitates the use of a substantial amount of inhibitor during their preparation and storage; it also requires that they be stored at relatively low temperature at all times prior to use. The result of this extreme activity toward polymerization renders their preparation and copolymerization relatively more expensive than would otherwise be the case.

We have discovered that the tendency for homopolymerization of polyhalogenated styrenes is entirely eliminated or at least greatly reduced by the presence of an alkyl group, such as methyl, ethyl, etc., attached to the alpha carbon of the olefin group. The presence of the alpha-alkyl group entirely prevents the objectionable fast homopolymerization of the usual nuclearly halogenated arylethylene compounds but surprisingly does not prevent the copolymerization of certain isomers with butadiene compounds, such as butadiene-1,3, isoprene, dimethyl butadiene, piperylene, chloroprene, cyanoprene and the like, preferably with seven carbon atoms or less.

We have also found that, whereas the 1-vinyl-dichlorobenzenes having a chlorine in the 2-position on the benzene nucleus may be polymerized or copolymerized to produce highly desirable products, the corresponding alpha-methylpolychlorostyrenes having chlorine in the 2-position do not form useful copolymers. At least we have been unable to polymerize or copolymerize them by conventional methods as generally used for production of rubbery materials.

The present invention is, therefore, restricted to the copolymerization of one or more of the aforementioned butadiene compounds with one or more polyhalogenated alpha-methylstyrenes or alpha-alkylarylethylene compounds having the portions next adjacent the nuclear carbon to which the vinyl group is attached, i. e. the 2- and 6-positions, free of halogen. The preferred polyhalogenated alpha-methylstyrenes are members of the group consisting of 3,4-dihalo-alpha-alkylstyrene and 3,5-dihalo-alpha-alkylstyrene and of these the 3,4- and 3,5-dichloro-alpha-methylstyrenes are most readily obtainable at the present time, although the corresponding fluorinated or brominated alpha-methylstyrenes may be used to form desirable products. Superior rubbery copolymers are obtained when the 3,4- and 3,5-dihalo-alpha-alkylstyrenes are relatively free of the other isomeric dihalostyrenes which merely act as diluents to deteriorate the copolymerization product.

One or more other comonomers may also be present if desired to modify the properties of the resultant rubbery copolymer. Such comonomers are preferably olefin compounds, i. e. compounds which contain a $>C=C<$, in which one of the free valences is attached to an activating group such as aryl, chlorinated or halogenated aryl, CN, halogen, $>C=C<$, —COOR (where R is hydrogen or a hydrocarbon group), etc. Examples of suitable monene compounds are the arylethylene compounds and nuclear-halogenated arylethylene compounds, including the nuclear-chlorinated styrenes such as the parachlorostyrene and the various di- and trichlorostyrenes, parachloro-alpha-methylstyrene, the vinyl naphthalenes and the various polychlorinated vinyl naphthalenes, acrylonitrile, acrylic and methacrylic esters, vinyl chloride, vinylidene chloride, and mixtures of such monene compounds.

The halogen-substituted alpha-alkylaryl olefins may be prepared by any of a number of methods as well-known in the art. Since, however, the nuclear chlorination of cumene with subsequent dehydrogenation or halogenation and dehydrohalogenation of the side chain results in a relatively high proportion of the undesirable 2-chlorinated alpha-methylstyrenes, it is preferable that the alpha-alkyldichlorostyrenes be prepared from the ortho- or metadichlorobenzene by successive alkylation and dehydrogenation or halogenation and dehydrohalogenation of the added side chain. The 3,4- and 3,5-dichloro-alpha-methylstyrenes, having less than 15 or 20% of any 2-chloro-alpha-methylstyrenes, as prepared respectively from ortho- and metadichlorobenzene, produce especially desirable copolymerization products for use in the rubbery and resinous fields.

It is generally true in any copolymer system that the property of the copolymer will vary with the relative proportions and types of the comonomers as well as with the methods and conditions of polymerization. This is also true in the present instance, both with the copolymers of a diene and 3,4- or 3,5-dihalo-alpha-methylstyrenes or other polymerizable polyhalogenated alpha-methylstyrenes, with or without other comonomers, such as the aforementioned acrylonitrile, styrene, etc.

The rubberlike properties of a copolymer of the polymerizable polyhalogenated alpha-methylstyrenes will generally be more pronounced when the copolymer contains 45 or 50%, or more, by weight, of one or more butadiene compounds. It is therefore preferred when rubberlike copolymers are desired to utilize about 45 or 50% to about 80 to 85% by weight of the diene and from about 15 or 20% to 50 or 55% by weight of the copolymerizable polyhalo-alpha-methylstyrene monomers, or a mixture of comonomers, including the polymerizable polyhalo-alpha-methylstyrenes. However, it is also within the purview of our invention to employ mixtures of dienes and one or more polyhalogen-substituted alpha-methylaryl olefins having the diene in any desired proportion, since useful properties may be obtained in each case.

The copolymerization may be carried out in any convenient manner, either en masse with or without a compatible solvent or diluent, or as an emulsion or suspension in an aqueous liquid or other immiscible liquid. When the polymerization is carried out en masse, a suitable peroxide catalyst and a somewhat elevated temperature are usually used.

The preferred method of polymerization is in aqueous emulsion. The mixture of polymerizable monomers is emulsified in water containing a suitable emulsifying agent and a suitable catalyst for accelerating or initiating polymerization. A modifying agent such as a relatively long-chain mercaptan may or may not be present to modify the properties of the copolymer material obtained. The polymerization product is obtained in the form of a latexlike emulsion or dispersion which may be used as such or may be coagulated by substantially the same methods used for the coagulation of rubber latices, for example by the addition of alcohol, an acid, a salt, or a mixture of such coagulants. A stabilizing agent or antioxidant is preferably added to the latex prior to coagulation. The emulsifying agents may be of the anionic or cationic type. Ordinary soaps, such as sodium and potassium salts of long-chain saturated or unsaturated acids and the alkyl sodium sulfates, such as sodium lauryl sulfate, etc., are especially desirable.

In our preferred method of emulsion copolymerization, we utilize an activator such as a complex compound of cobalt together with a suitable cooperating material such as dodecyl mercaptan or other compound that cooperates with the complex compound to cause acceleration of the polymerization reaction. Such systems of polymerization, any of which may be used in the polymerization of the compounds of the present invention, are more particularly described in the copending applications of John C. Warner and Harry Seltz, Serial No. 577,328, filed February 10, 1945, now abandoned and Serial Number 687,954 filed Aug. 2, 1946.

The following example in which parts are by weight, illustrate the invention.

| | Parts |
|---|---|
| 3,4-dichloro-alpha-methylstyrene | 30 |
| Butadiene-1,3 | 70 |
| Water | 180 |
| Soap (sodium stearate) | 2 |
| Dodecyl mercaptan | .5 |
| Potassium cobaltinitrate | .1 |
| Potassium persulfate | .075 |
| Condensation product of naphthalene sulfonic acids and formaldehyde | 0.5 |
| $Na_2SiO_3$ | 0.3 |

The potassium persulfate, sodium silicate, soap and cobaltinitrite were mixed with water prior to the addition of the monomeric materials and the mercaptan. The polymerization was accomplished in an autoclave maintained at a temperature of 45° C. under constant agitation. A yield of about 85% was obtained in thirteen hours. The latex was coagulated and the coagulum compounded with about 45 parts of carbon black and the sulfur and other compounding ingredients in the proportions of the standard test formula recommended by the Rubber Reserve Corporation for evaluation of rubbery polymers.

Test slabs cured for 30, 50, 70 and 90 minutes had the respective tensile strengths of 4210, 4460, 4450 and 4310 lbs./sq. in., respective elongations of 720%, 670%, 655% and 645%, and respective moduli (300%) or 720, 1010, 1050, and 1090 pounds. When tested in hot water, at about 212° F. the tensile strengths were 1650, 1440, 1420 and 1370 lbs./sq. in. for the slabs cured for the respective times.

The corresponding tensile strengths of the similarly compounded copolymer of 30 parts of a mixture of isomers of dichlorostyrenes and 70 parts of butadiene according to a substantially identical recipe were only 3850, 3950, 3690 and 3750 lbs./sq. in. for the respective 30, 50, 70, and 90 minute cures.

In the above example, the 3,4-dichloro-alpha-methylstyrene may be substituted in whole or in part by one or more of the 3,5-dichloro-alpha-methylstyrene, 3,4,5-trichloro-alpha-methylstyrene, the corresponding alpha-ethylstyrenes and other alpha-alkylstyrenes, the 3,4- and 3,5-difluoro-alpha-alkyl (preferably methyl) styrenes, the 3,4,5-trifluoro-alpha-methylstyrene, the 3,4- and 3,5-dibromo-alpha-methylstyrenes and the 3,4,5-tribromo-alpha-alkylstyrenes as well as alpha-alkylstyrenes, leaving a mixture of different kinds of nuclear halogen atoms to yield copolymers with desirable results.

The butadiene-1,3 of the above example may be substituted in whole or in part by other butadiene compounds such as isoprene, dimethyl butadiene, piperylene, cyanoprene, chloroprene, etc.

One or more hard resin-forming monomeric materials such as vinylidene chloride, acrylonitrile, styrenes, halogenated styrenes (especially mono- and dichlorostyrenes), vinyl naphthalene, halogenated vinyl naphthalenes, such as 1-vinyl-4-chloronaphthalene, etc. may also be present if desired.

It is to be understood that variations and modifications of the specific products and processes herein shown and described for purposes of illustration may be made without departing from the spirit of the invention.

What we claim is:

1. A vulcanizable rubbery copolymerization product of a conjugated diolefinic compound having less than eight carbon atoms and an alpha-alkylarylethylene having less than three carbons in the alpha-alkyl group, having a plurality of nuclear halogen atoms and having the positions on the benzene ring next adjacent the carbon atom directly attached to the olefinic group connected directly to a hydrogen, 45% to 85% by weight of said polymer being formed from polymerizable conjugated diolefinic compounds.

2. The product of claim 1 wherein the nuclear-halogenated alpha-alkylarylethylene compound is a dichloro-alpha-methylstyrene having the 2- and 6-positions of the nucleus connected directly to hydrogen.

3. The product of claim 1 wherein the major proportion of the nuclear-halogenated alpha-alkylarylethylene compound is a 3,4-dichloro-alphamethylstyrene.

4. The product of claim 1 wherein the major proportion of the nuclear-halogenated alpha-alkylarylethylene compound is a 3,5-dichloro-alphamethylstyrene.

5. A vulcanizable rubbery copolymer of a polymerizable conjugated diolefin having less than eight carbon atoms and an alpha-methyldichlorostyrene which is substantially free of alpha-alkylstyrenes having a substituent in the positions next adjacent to the isopropenyl group, 45% to 85% of the weight of said copolymer resulting from atoms from the copolymerization of conjugated diolefinic compounds.

6. A vulcanizable copolymer of a polymerizable conjugated diolefin having less than eight carbon atoms and 3,4,5-trichloro-alpha-methylstyrene containing 45% to 85% by weight based on said copolymer of said conjugated diolefin.

7. A method of forming a rubbery copolymer which comprises emulsifying in water a mixture of a polymerizable conjugated diolefinic compound having less than eight carbon atoms and a nuclear polyhalogenated alpha-methylstyrene having nuclear carbon atoms adjacent that directly carrying the isopropenyl group free of substituents, and maintaining said emulsion until a rubbery polymer is formed, the conjugated diolefinic compounds in said mixture being at least 45% of the weight of the total of conjugated diolefinic compounds and nuclear polyhalogenated alpha-methylstyrene.

8. The process which comprises forming an aqueous emulsion of a mixture of monomers including a conjugated diolefin having less than eight carbon atoms and a nuclear-polyhalogenated alpha-alkylstyrene having less than three carbons in the alpha-alkyl group and having the positions next adjacent the nuclear carbon atom to which the isopropenyl group is attached connected to hydrogen, and agitating said emulsion until an aqueous dispersion of polymeric material is formed, at least 45% by weight of said mixture of monomers being diolefinic compounds.

9. The process which comprises emulsifying in aqueous liquid, a mixture of monomers comprising a nuclear dihalogenated isopropenyl-benzene having the 2- and 6-positions of the nucleus connected to hydrogen and a polymerizable conjugated diolefinic compound having less than seven carbon atoms, and subjecting the monomeric materials of said emulsion to a free radical-forming polymerization catalyst to convert said emulsion into a latex containing dispersed polymeric material, at least 45% by weight of said mixture being a diolefinic compound, and said halogenated isopropenyl-benzene being present in distinguishable amounts.

10. The process which comprises emulsifying in an aqueous solution of an emulsifying agent a 3,4-dichloro-alpha-methylstyrene and a polymerizable conjugated diolefinic compound having less than eight carbon atoms, and maintaining said emulsion in the absence of effective amounts of a polymerization inhibitor until a latex of polymeric material is formed, the polymerizable diolefinic compounds in said emulsion being at least 50% by weight of the copolymerizable materials, the 3,4-dichloro-alpha-methylstyrene being present in distinguishable and effective amounts, whereby a vulcanizable rubbery polymerization product is formed.

11. The process of claim 10 wherein the polymerizable conjugated diolefinic compounds having less than eight carbon atoms constitute 50% to about 80% by weight of the polymerizable constituents.

12. A vulcanizable rubbery copolymerization product of a butadiene-1,3 and 3,4-dichloro-alpha-methylstyrene, said copolymerization product containing at least 45% by weight of said butadiene 1-3 and distinguishable amounts of 3,4-dichloro-alpha-methylstyrene.

GUSTAVE B. BACHMAN.
GUIDO H. STEMPEL, Jr.

REFERENCES CITED

The following references are of record in the file of this patent:

UNITED STATES PATENTS

| Number | Name | Date |
|---|---|---|
| 2,384,535 | Craig | Sept. 11, 1945 |
| 2,439,076 | Clark | Apr. 6, 1948 |